United States Patent
Weitzel et al.

(10) Patent No.: US 10,538,657 B2
(45) Date of Patent: Jan. 21, 2020

(54) POLYMER BLENDS IN THE FORM OF AQUEOUS DISPERSIONS OR POWDERS THAT CAN BE REDISPERSED IN WATER

(71) Applicant: Wacker Chemie AG, Munich (DE)

(72) Inventors: Hans-Peter Weitzel, Reischach (DE); Ulf Dietrich, Burghausen (DE); Peter Fritze, Haiming (DE); Klas Sorger, Munich (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 15/553,045

(22) PCT Filed: Feb. 18, 2016

(86) PCT No.: PCT/EP2016/053468
§ 371 (c)(1),
(2) Date: Aug. 23, 2017

(87) PCT Pub. No.: WO2016/135039
PCT Pub. Date: Sep. 1, 2016

(65) Prior Publication Data
US 2018/0244909 A1    Aug. 30, 2018

(30) Foreign Application Priority Data
Feb. 23, 2015   (DE) .................. 10 2015 203 227

(51) Int. Cl.
*C04B 28/04*  (2006.01)
*C04B 40/00*  (2006.01)
*C08L 31/04*  (2006.01)
*C09D 5/02*  (2006.01)
*C09D 5/03*  (2006.01)
*C09D 5/34*  (2006.01)
*C09D 131/04*  (2006.01)
*C09J 131/04*  (2006.01)
*C04B 103/00*  (2006.01)
*C04B 111/00*  (2006.01)
*C04B 111/60*  (2006.01)
*C04B 111/70*  (2006.01)
*C04B 111/72*  (2006.01)

(52) U.S. Cl.
CPC .............. *C08L 31/04* (2013.01); *C04B 28/04* (2013.01); *C04B 40/0039* (2013.01); *C04B 40/0042* (2013.01); *C09D 5/022* (2013.01); *C09D 5/03* (2013.01); *C09D 5/34* (2013.01); *C09D 131/04* (2013.01); *C09J 131/04* (2013.01); *C04B 2103/0057* (2013.01); *C04B 2111/00517* (2013.01); *C04B 2111/00637* (2013.01); *C04B 2111/00672* (2013.01); *C04B 2111/60* (2013.01); *C04B 2111/70* (2013.01); *C04B 2111/72* (2013.01); *C08L 2201/50* (2013.01); *C08L 2205/02* (2013.01); *C08L 2205/025* (2013.01)

(58) Field of Classification Search
CPC ................ C08L 31/04; C08L 2205/02; C08L 2205/025; C08L 2201/50; C04B 28/04; C04B 40/0042; C04B 40/0039; C04B 2103/0057; C04B 2111/00517; C04B 2111/00637; C04B 2111/00672; C04B 2111/60; C04B 2111/70; C04B 2111/72; C09D 5/34; C09D 5/022; C09D 5/03; C09D 131/04; C09J 131/04
See application file for complete search history.

(56) References Cited

U.S. PATENT DOCUMENTS

| | | |
|---|---|---|
| 5,907,011 A | 5/1999 | Jakob et al. |
| 2002/0162485 A1 | 11/2002 | Jodlbauer et al. |
| 2003/0065079 A1 | 4/2003 | Weitzel |
| 2009/0192242 A1 | 7/2009 | Willimann et al. |
| 2015/0119519 A1 | 4/2015 | Weitzel et al. |

FOREIGN PATENT DOCUMENTS

| | | |
|---|---|---|
| EP | 0255363 A2 | 2/1988 |
| EP | 0334591 A1 | 9/1989 |
| EP | 0702057 A2 | 3/1996 |
| EP | 1238958 A1 | 9/2002 |
| EP | 1262465 A2 | 12/2002 |
| EP | 2158265 A1 | 3/2010 |
| EP | 2399955 A1 | 12/2011 |
| WO | 2006099960 A1 | 9/2006 |
| WO | 2008140852 A1 | 11/2008 |
| WO | 2013178721 A1 | 12/2013 |
| WO | 2014052033 A1 | 4/2014 |

OTHER PUBLICATIONS

Schulze, J. et al., "Redispersionspulver im Zement," TIZ-Fachberichte, vol. 109, No. 9, 1985, 6 Pages.
(Continued)

*Primary Examiner* — Patrick D Niland
(74) *Attorney, Agent, or Firm* — Brooks Kushman P.C.

(57) ABSTRACT

Open time and creep resistance of hydraulically settable inorganic construction materials such as mortars and tile adhesives are both improved at the same time by the addition of a polymer mixture in the form of an aqueous dispersion or water-redispersible powder, containing one or more protective colloid-stabilized polymers having units derived from 20% to 30% by weight of vinyl chloride, 50% to 75% by weight of vinyl acetate, 5% to 20% by weight of ethylene, and one or more protective colloid-stabilized, vinyl halide-free polymers of one or more ethylenically unsaturated monomers.

15 Claims, No Drawings

(56) References Cited

OTHER PUBLICATIONS

Fox, T. G., "Influence of Diluent and of Copolymer Composition on the Glass Temperature of a Polymer System," Rohm & Haas Company, Bull. Am. Physics Soc.. Session J, 1956, 1 Page.
Brandrup, J., Polymer Handbook 2nd Edition, J. Wiley & Sons, New York, 1975, 58 Pages.
WO 13178721, U.S. 2015/0119519.
EP 1262465, U.S. 2003/0065079.
WO 06099960, U.S. 2009/0192242.
EP 2158265, WO 08140852.
EP 0702057, U.S. Pat. No. 5,907,011.
EP 1238958, U.S. 2002/0162485.
Schulze J. in TIZ, No. 9, 1985, English Abstract.

POLYMER BLENDS IN THE FORM OF AQUEOUS DISPERSIONS OR POWDERS THAT CAN BE REDISPERSED IN WATER

CROSS REFERENCE TO RELATED APPLICATIONS

This application is the U.S. National Phase of PCT Appln. No. PCT/EP2016/053468 filed Feb. 18, 2016, which claims priority to German Application No. 10 2015 203 227.2 filed Feb. 23, 2015, the disclosures of which are incorporated in their entirety by reference herein.

BACKGROUND OF THE INVENTION

1. Field of the Invention

The invention relates to polymer mixtures in the form of aqueous dispersions or water-redispersible powders comprising at least two different polymers of ethylenically unsaturated monomers, to processes for producing the polymer mixtures and to the use thereof in construction-chemical products, especially in conjunction with hydraulically setting binders, for example in adhesive mortars such as tile adhesives.

2. Description of the Related Art

Water-redispersible polymer powders (polymer powders) are powder compositions obtainable by means of drying the corresponding aqueous polymer dispersions in the presence of protective colloids. On account of this production process, the finely divided polymer resin in the dispersion is ensheathed with a sufficient amount of a water-soluble protective colloid. In the course of drying, the protective colloid acts like a shell that prevents the conglutination of the particles. In the course of redispersion of the polymer powders in water, the protective colloid dissolves again in water and affords an aqueous dispersion of the original polymer particles (Schulze J. in TIZ, No. 9, 1985).

The use of polymer powders or aqueous dispersions of polymers based on ethylenically unsaturated monomers such as vinyl acetate and ethylene in construction-chemical products such as dry mortars for improvement of the performance properties thereof, has been established for some time. For improvement of the bond strengths of construction chemical products, the addition of polymers having specific monomer compositions has been recommended, as described, for example, in WO-A 2013/178721, EP-A 1262465, EP-A 0255363 or EP-A 0334591. For this purpose, EP-A 2399955 and WO-A 6099960 teach the use of polymer mixtures. EP-A 2158265 and EP-A 702057 disclose polymer mixtures of vinyl ester copolymers for improving the water stability and heat resistance of application products.

In addition to the profile of properties of the building material compositions supplied by the polymer powders, users also expect simple and comfortable applicability of the building material compositions. For instance, building material compositions having a longer open time and simultaneously having improved creep resistance are in demand. A longer open time enables a longer processing time for the building material compositions and correction of the building material compositions applied before the building material compositions harden. An improved creep resistance leads to dimensional stability of building material compositions applied, such that they do not "slide off" a wall, for example. Such intrinsically antagonistic properties should, if possible, be controllable by addition of just a single additive. This is because addition of further additives, especially those that are chemically different, or the addition of greater amounts of these additives is deprecated among users, since such additives can have a variety of effects, some of them unforeseeable, on the building material compositions or built structures, and can worsen the profile of properties of the optimized formulations. WO-A 14052033 describes, for prolonging the open time and for accelerating the setting rate of mortars, polymer powder mixtures comprising styrene copolymers and (meth)acrylate copolymers that are free of protective colloids such as polyvinyl alcohol.

In addition to the characteristics described above, the hardened construction products should be stable to deformation under stress.

Against this background, the problem addressed was that of providing additives for construction-chemical products with which the open time of building material compositions can be extended and, at the same time, the creep resistance of the as yet incompletely set building material compositions can be improved. Furthermore, the hardened construction products thus obtainable should, if possible, be more stable to deformation.

SUMMARY OF THE INVENTION

The invention provides polymer mixtures in the form of aqueous dispersions or water-redispersible powders comprising
A) one or more polymers of one or more vinyl halides and optionally one or more further ethylenically unsaturated monomers and
B) one or more vinyl halide-free polymers of one or more ethylenically unsaturated monomers.

DESCRIPTION OF THE PREFERRED EMBODIMENTS

The polymer mixtures preferably contain 5% to 95% by weight, more preferably 10% to 90% by weight, yet more preferably 20% to 80% by weight, and most preferably 30% to 70% by weight of one or more polymers A), based on the dry weight of the polymers A) and B).

The polymer mixtures contain preferably 5% to 95% by weight, more preferably 10% to 90% by weight, yet more preferably 20% to 80% by weight, and most preferably 30% to 70% by weight of one or more polymers B), based on the dry weight of the polymers A) and B).

The polymers A) and B) are different from one another.

The polymer mixtures preferably contain 5% to 95% by weight, more preferably 15% to 90% by weight, yet more preferably 30% to 90% by weight, still more preferably 40% to 85% by weight, and most preferably 50% to 80% by weight and with maximum preference 60% to 75% by weight of polymers A) and polymers B), based on the dry weight of the polymer mixtures, and on the dry weight of the polymers A) and polymers B).

The polymers A) are generally obtainable by means of free-radically initiated polymerization of one or more vinyl halides and optionally one or more further ethylenically unsaturated monomers.

The preferred vinyl halide is vinyl chloride.

The further ethylenically unsaturated monomers for the polymers A) are preferably selected from the group comprising vinyl esters, (meth)acrylic esters, vinylaromatics, olefins and 1,3-dienes. The further ethylenically unsaturated monomers generally do not comprise any vinyl halide, especially any vinyl chloride.

Preference is given to vinyl esters of carboxylic acids having 2 to 15 carbon atoms, such as vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 carbon atoms, for example VeoVa9R or VeoVa10R (trade name of Hexion). Particular preference is given to vinyl acetate.

Suitable esters of acrylic acid or methacrylic acid are, for example, esters of unbranched or branched alcohols having 1 to 15 carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Preference is given to methyl acrylate, methyl methacrylate, n-butyl acrylate and 2-ethylhexyl acrylate.

Preferred vinylaromatics are styrene, methylstyrene and vinyl-toluene. The preferred olefins are ethylene and propylene, and the preferred dienes are 1,3-butadiene and isoprene.

Preferred combinations of further ethylenically unsaturated monomers are one or more vinyl esters and olefins, especially ethylene, and optionally one or more additional further ethylenically unsaturated monomers.

In the case of use of two or more vinyl esters, preference is given to a combination of vinyl acetate and one or more vinyl esters of carboxylic acids having 3 to 15 carbon atoms, for example vinyl acetate in combination with vinyl laurate and/or vinyl esters of α-branched monocarboxylic acids having 9 to 13 carbon atoms.

Monomers other than vinyl halides, vinyl esters and olefins are preferably used to an extent of 0% to 20% by weight, more preferably 0% to 10% by weight and most preferably 0% to 5% by weight, based on the total weight of the monomers. The further monomers preferably comprise less than 10% by weight, more preferably less than 5% by weight and most preferably less than 1% by weight of vinylaromatics and esters of acrylic acid or methacrylic acid, based in each case on the total weight of the monomers. Most preferably, the polymers A) do not contain any monomer unit of a vinylaromatic and/or any monomer unit of an ester of acrylic acid or methacrylic acid.

It is optionally possible for another 0.05% to 10% by weight, preferably 0.05% to 5% by weight and more preferably 0.05% to 2.5% by weight, based on the total weight of the ethylenically unsaturated monomers, of auxiliary monomers to be included in the copolymer. Most preferably, no auxiliary monomers are included in the copolymer. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid, such as the diethyl and diisopropyl esters, maleic anhydride, ethylenically unsaturated sulfonic acids or salts thereof, preferably vinylsulfonic acid, 2-acrylamido-2-methylpropane-sulfonic acid. Further examples are precrosslinking comonomers such as polyethylenically unsaturated comonomers, for example divinyl adipate, diallyl maleate, allyl methacrylate or triallyl cyanurate, or postcrosslinking comonomers, for example acrylamidoglycolic acid (AGA), methylacrylamidoglycolate (MAGME), N-methylolacrylamide (NMA), N-methylolmethacrylamide (NMMA), N-methylolallyl carbamate, alkyl ethers such as the isobutoxy ether or esters of N-methylolacrylamide, of N-methylolmethacrylamide and of N-methylolallyl carbamate. Also suitable are epoxy-functional comonomers such as glycidyl methacrylate and glycidyl acrylate. Further examples are silicon-functional comonomers, such as acryloyloxypropyltri(alkoxy)- and methacryloyloxypropyltri(alkoxy)silanes, vinyltrialkoxysilanes and vinylmethyldialkoxysilanes, where the alkoxy groups present may, for example, be methoxy, ethoxy and ethoxy propylene glycol ether radicals. Mention should also be made of monomers having hydroxyl or CO groups, for example hydroxyalkyl methacrylates and acrylates, such as hydroxyethyl acrylate or methacrylate, hydroxypropyl acrylate or methacrylate or hydroxybutyl acrylate or methacrylate, and compounds such as diacetoneacrylamide and acetylacetoxyethyl acrylate or methacrylate.

Preferred polymers A) are based on one or more vinyl halides, especially vinyl chloride, one or more vinyl esters, especially vinyl acetate, and optionally one or more additional further ethylenically unsaturated monomers, especially ethylene.

Particularly preferred polymers A) are based preferably on 5% to 80% by weight, more preferably 10% to 50% by weight, yet more preferably 15% to 35% by weight and most preferably 20% to 30% by weight of vinyl halides. The polymers A) are based preferably on 20% to 95% by weight, more preferably 50% to 90% by weight, yet more preferably 65% to 85% by weight and most preferably 70% to 80% by weight of further ethylenically unsaturated monomers. The figures in % by weight are based on the total weight of the monomers for preparation of the polymers A). For each polymer A), the figures in % by weight add up to 100% by weight.

Most preferred polymers A) are based preferably on 15% to 35% by weight, especially 20% to 30% by weight of vinyl chloride, 40% to 80% by weight, especially 50% to 75% by weight of vinyl acetate, 1% to 25% by weight, especially 5% to 20% by weight of ethylene, and optionally one or more additional further ethylenically unsaturated monomers, where the figures in % by weight are based on the total weight of the monomers and add up to 100% by weight.

The polymers B) are generally obtainable by means of free-radically initiated polymerization of one or more ethylenically unsaturated monomers other than vinyl halides, especially other than vinyl chloride. The polymers B) generally do not contain any vinyl halide unit, and especially any vinyl chloride unit. The polymers B) are thus generally different than polymers A).

The polymers B) are preferably based on one or more ethylenically unsaturated monomers selected from the group comprising vinyl esters, (meth)acrylic esters, vinylaromatics, olefins and 1,3-dienes. For clarification, it should be noted that the ethylenically unsaturated monomers for preparation of the polymers B) do not include any vinyl halide, especially any vinyl chloride.

The monomers mentioned in relation to the polymers B) may assume the preferred and most preferred definitions given above in the description of the polymers A). In addition, the polymers B) may contain the auxiliary monomers mentioned above in the amounts mentioned above.

Preference is given to polymers B) containing one or more monomers from the group comprising vinyl acetate, vinyl esters of α-branched monocarboxylic acids having 9 to 13 carbon atoms, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, 2-propylheptyl acrylate, styrene and butadiene.

More preferred polymers B) are homopolymers of vinyl acetate; copolymers with vinyl acetate and ethylene; copolymers with vinyl acetate, ethylene and a vinyl ester of α-branched monocarboxylic acids having 9 to 13 carbon atoms; copolymers with vinyl acetate and one or more (meth)acrylic esters of unbranched or branched alcohols having 1 to 18 carbon atoms, especially methyl acrylate, ethyl acrylate, propyl acrylate, n-butyl acrylate, 2-ethylhexyl acrylate, 2-propylheptyl acrylate and optionally ethylene; copolymers with one or more (meth)acrylic esters of unbranched or branched alcohols having 1 to 18 carbon atoms, such as n-butyl acrylate and 2-ethylhexyl acrylate and/or methyl methacrylate and optionally ethylene; copolymers with styrene and one or more monomers from the group of methyl acrylate, ethyl acrylate, propyl acrylate, n-butyl acrylate, 2-ethylhexyl acrylate and optionally ethylene; copolymers with 1,3-butadiene and styrene and/or methyl methacrylate and optionally further acrylic esters; where the mixtures mentioned may optionally contain one or more of the abovementioned auxiliary monomers.

Particular preference is given to copolymers of one or more vinyl esters with 1% to 50% by weight of ethylene; copolymers of vinyl acetate with 1% to 50% by weight ethylene and 1 to 50% by weight of one or more further comonomers from the group of vinyl esters having 1 to 13 carbon atoms in the carboxyl radical, such as vinyl propionate, vinyl laurate, vinyl esters of alpha-branched carboxylic acids having 9 to 13 carbon atoms, such as VeoVa9, VeoVa10, VeoVa11; copolymers of one or more vinyl esters, 1% to 50% by weight of ethylene and preferably 1% to 60% by weight of (meth)acrylic esters of unbranched or branched alcohols having 1 to 15 carbon atoms, especially n-butyl acrylate, 2-propylheptyl acrylate or 2-ethylhexyl acrylate; and copolymers with 30% to 75% by weight of vinyl acetate, 1 to 30% by weight of vinyl laurate or vinyl esters of an alpha-branched carboxylic acid having 9 to 13 carbon atoms, and 1% to 30% by weight of (meth)acrylic esters of unbranched or branched alcohols having 1 to 17 carbon atoms, especially n-butyl acrylate, 2-propylheptyl acrylate or 2-ethylhexyl acrylate, which also contain 1% to 40% by weight ethylene; where the polymers may also contain the auxiliary monomers mentioned in the amounts specified, and the figures in % by weight add up to 100% by weight in each case.

Particular preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate and optionally ethylene; vinyl acetate-acrylic ester copolymers with one or more monomers from the group of methyl acrylate, ethyl acrylate, propyl acrylate, n-butyl acrylate, 2-ethylhexyl acrylate, 2-propylheptyl acrylate and optionally ethylene; where the polymers may also contain auxiliary monomers in the amounts specified, and the figures in % by weight add up to 100% by weight in each case.

Most preferred are copolymers with vinyl acetate and 1% to 50% by weight, especially 5% to 30% by weight, of ethylene; or copolymers with vinyl acetate, 1% to 50% by weight ethylene and 1% to 50% by weight of a vinyl ester of α-branched monocarboxylic acids having 9 to 13 carbon atoms; or copolymers with 30% to 75% by weight of vinyl acetate, 1% to 30% by weight of vinyl laurate or vinyl esters of an alpha-branched carboxylic acid having 9 to 13 carbon atoms, and 1% to 30% by weight of (meth)acrylic esters of unbranched or branched alcohols having 1 to 17 carbon atoms, which also contain 1% to 40% by weight of ethylene; where the figures in % by weight add up to 100% by weight in each case.

The selection of monomers and the selection of the proportions by weight of the comonomers are made so as to result generally in glass transition temperatures Tg for the polymers A), the polymers B) and for the polymer mixtures of ≤+120° C., preferably −50° C. to +60° C., even more preferably −30° C. to +40° C. and most preferably −15° C. to +20° C. The glass transition temperature Tg of the polymers can be determined in a known manner by means of differential scanning calorimetry (DSC). The Tg can also be calculated in advance as an approximation by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ is the mass fraction (% by weight/100) of the monomer n, and $Tg_n$ is the glass transition temperature in Kelvin of the homopolymers of the monomer n. Tg values for homopolymers are listed in Polymer Handbook 2nd Edition, J. Wiley & Sons, New York (1975).

The polymers A) and B) are generally prepared by free-radically initiated polymerization of the ethylenically unsaturated monomers in an aqueous medium, for example by suspension polymerization, or preferably emulsion polymerization methods, that are known per se. The polymers A) and B) are generally prepared separately from one another. The polymerization is generally effected in the presence of emulsifiers, or preferably in the presence of protective colloids The polymerization temperature is generally 40° C. to 150° C., preferably 60° C. to 90° C. The polymerization can be initiated with redox initiator combinations that are in common use for emulsion polymerization. Examples of suitable oxidation initiators are the sodium, potassium and ammonium salts of peroxodisulfuric acid, hydrogen peroxide, t-butyl peroxide, t-butyl hydroperoxide, potassium peroxodiphosphate, t-butyl peroxopivalate, cumene hydroperoxide, isopropylbenzene monohydroperoxide, and azobisisobutyronitrile. Preference is given to the sodium, potassium and ammonium salts of peroxodisulfuric acid and hydrogen peroxide. The initiators mentioned are generally used in an amount of 0.01% to 2.0% by weight, based on the total weight of the ethylenically unsaturated monomers.

Suitable reducing agents are, for example, the sulfites and bisulfites of the alkali metals and of ammonium, such as sodium sulfite, the derivatives of sulfoxylic acid such as zinc or alkali metal formaldehydesulfoxylates, for example sodium hydroxymethanesulfinate (Brüggolit) and (iso) ascorbic acid. Preference is given to sodium hydroxymethanesulfinate and (iso)ascorbic acid. The amount of reducing agent is preferably 0.015% to 3% by weight, based on the total weight of the ethylenically unsaturated monomers.

The oxidizing agents mentioned, especially the salts of peroxodisulfuric acid, can also be used alone as thermal initiators.

The molecular weight can be controlled by using substances that act as chain transfer agents during the polymerization. If chain transfer agents are used, they are typically used in amounts between 0.01% and 5.0% by weight, based on the monomers to be polymerized, and are metered in separately or else having been premixed with reaction components. Examples of such substances are n-dodecyl mercaptan, tert-dodecyl mercaptan, mercaptopropionic acid, methyl mercaptopropionate, isopropanol and acetaldehyde. Preference is given to using no substances that act as chain transfer agents.

Examples of protective colloids that are commonly used for stabilization of the polymerization mixture are partly hydrolyzed or fully hydrolyzed polyvinyl alcohols; polyvinylpyrrolidones; polyvinyl acetals; polysaccharides in water-soluble form, such as starches (amylose and amylopectin), celluloses or derivatives thereof, such as carboxymethyl, methyl, hydroxyethyl, and hydroxypropyl derivatives; proteins such as casein or caseinate, soya protein, gelatin; lignosulfonates; synthetic polymers such as poly(meth)acrylic acid, copolymers of (meth)acrylates with carboxy-functional comonomer units, poly(meth)acrylamide, polyvinylsulfonic acids and the water-soluble copolymers thereof; melamine formaldehydesulfonates, naphthalene formaldehydesulfonates, and styrene-maleic acid and vinyl ether-maleic acid copolymers. The protective colloids are commercially available and obtainable by means of methods known to those skilled in the art.

Preferred protective colloids are partly hydrolyzed or fully hydrolyzed polyvinyl alcohols. Particular preference is given to partly hydrolyzed polyvinyl alcohols having a hydrolysis level of 80 to 95 mol %, especially 83 to 93 mol %, and a Hoppler viscosity, in 4% aqueous solution, of 1 to 30 mPas, especially 3 to 15 mPas (Höppler method at 20° C., DIN 53015).

Protective colloids are preferably not cellulose and/or cellulose derivatives. More preferably, aside from one or more polyvinyl alcohols as protective colloids, no further protective colloids are used.

The protective colloids are generally added in the polymerization in a total amount of 1% to 20% by weight, based on the total weight of the ethylenically unsaturated monomers.

Preference is given to polymerization without addition of emulsifiers, especially without addition of anionic emulsifiers. If polymerization is effected with addition of emulsifiers, preferred amounts of emulsifiers are 0.2% to 5% by weight, based on the amount of monomers. Suitable emulsifiers are, for example, standard anionic, cationic or nonionic emulsifiers, such as anionic surfactants, especially alkyl sulfates having a chain length of 8 to 18 carbon atoms, alkyl or alkylaryl ether sulfates having 8 to 18 carbon atoms in the hydrophobic residue and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants, such as alkyl polyglycol ethers or alkylaryl polyglycol ethers having 8 to 40 ethylene oxide units.

On conclusion of the polymerization, residual monomers can be removed by postpolymerization by employment of known methods, for example by redox catalyst-initiated postpolymerization. Volatile residual monomers can also be removed by means of distillation, preferably under reduced pressure, and optionally while passing inert entraining gases through or over the mixture, such as air, nitrogen or water vapor.

The polymers are generally obtained in the form of aqueous dispersions, especially in the form of protective colloid-stabilized aqueous dispersions. The aqueous polymer dispersions preferably have a solids content of 30% to 75% by weight and more preferably 50% to 65% by weight.

For production of water-redispersible polymer powders, the aqueous dispersions, optionally after addition of protective colloids as a drying aid, can be dried, for example by means of fluidized bed drying, freeze drying or spray drying. Preference is given to spray drying the dispersions. The spray drying can be conducted in standard spray drying systems, in which case atomization can be effected, for example, by means of one-, two- or multiphase nozzles or with a rotating disk. The exit temperature is generally chosen within the range from 45° C. to 120° C., preferably 60° C. to 90° C., according to the system, Tg of the resin, and desired degree of drying.

In general, the drying aid is used in a total amount of 3% to 30% by weight, based on the polymer constituents of the dispersion. The total amount of protective colloid prior to the drying operation is preferably 3% to 30% by weight, more preferably 5% to 20% by weight, based on the polymer content. Suitable drying aids are, for example, the abovementioned protective colloids, especially the abovementioned polyvinyl alcohols. Preference is given to using no further protective colloids other than polyvinyl alcohols as drying aids.

In the atomization, a content of up to 3% by weight of antifoam, based on the base polymer, has been found to be favorable in many cases. To increase storability by improvement of blocking stability, the powder obtained can be provided with an antiblocking agent (anticaking agent), preferably up to 30% by weight, based on the total weight of polymer constituents. Examples of antiblocking agents are calcium carbonate or magnesium carbonate, talc, gypsum, silica, especially hydrophobic silica, kaolins, and silicates, having particle sizes, preferably in the range from 10 nm to 10 μm.

The viscosity of the feed to be atomized is preferably adjusted by the solids content so as to obtain a value of <500 mPas (Brookfield viscosity at 20 revolutions and 23° C.), more preferably <250 mPas. The solids content of the dispersion to be atomized is preferably >35%, morepreferably >40%.

To improve the performance properties, it is possible to add further additives, for example in the atomization. Further constituents of redispersible polymer powder compositions that are present in preferred embodiments are pigments, fillers, foam stabilizers, and hydrophobizing agents.

The polymer mixtures or the polymers A) and/or the polymers B) are, for example, in the form of protective colloid-stabilized, water-redispersible powders. Preferably, the polymer mixtures in the form of aqueous dispersions or water-redispersible powders do not contain any further protective colloids aside from one or more polyvinyl alcohols. Preferred polymer mixtures in the form of aqueous dispersions or water-redispersible powders do not contain any anionic emulsifiers, and especially do not contain any emulsifiers.

The polymer mixtures may also comprise antiblocking agents, especially the abovementioned antiblocking agents, and optionally antifoams. In addition, the polymer mixtures may comprise the additives described previously.

The invention further provides processes for producing the polymer mixtures of the invention in the form of aqueous dispersions or water-redispersible powders, characterized in that one or more inventive polymers A) and one or more inventive polymers B) are mixed.

The polymers A) and B) are generally mixed after the preparation or at any time after the preparation of the polymers by means of polymerization. The polymers A) and B) can be mixed before, during or after the drying of the aqueous dispersions thereof. The polymers A) and B) can be mixed in aqueous or dry form. Preferably, the polymers A) and B) are in the form of aqueous dispersions or in the form of water-redispersible powders during the mixing.

In a preferred embodiment for production of polymer mixtures in the form of water-redispersible powders, aqueous dispersions of polymers A) are mixed with aqueous dispersions of polymers B) and the aqueous mixture thus obtained is dried. Alternatively, aqueous dispersions of polymers A) and aqueous dispersions of polymers B), in a spatially separate manner or in the same space, can be introduced into a drying system for production of polymer mixtures in the form of water-redispersible powders. Finally, it is also possible to mix polymers A) in the form of water-redispersible powders and polymers B) in the form of water-redispersible powders.

Inventive polymer mixtures in the form of aqueous dispersions are preferably produced by mixing aqueous dispersions of polymers A) with aqueous dispersions of polymers B). Inventive dispersions are also obtainable by redispersing inventive polymer mixtures in the form of water-redispersible powders comprising polymers A) and B) in water. Finally, it is also possible to redisperse polymers A) and/or polymers B) in the form of water-redispersible powders with aqueous dispersions comprising polymers A) and/or polymers B).

The invention further provides building material compositions comprising one or more hydraulically setting binders, one or more fillers and optionally one or more additives, characterized in that the building material compositions additionally comprise one or more inventive polymer mixtures in the form of aqueous dispersions or water-redispersible powders.

The invention further provides for the use of the inventive polymer mixtures in the form of aqueous dispersions or water-redispersible powders as additives for building material compositions, especially for construction chemical products, optionally in conjunction with hydraulically setting binders, for example for the production of construction adhesives, renders, spackling compounds, floor leveling compounds, sealing compounds, joint mortars or paints.

Particular preference is given to the use of the polymer mixtures in tile adhesives, joint mortars, renders, spackling compounds or sealing compounds. Most preferred are tile adhesives or joint mortars. Examples of tiles are earthenware tiles, stoneware tiles, fine stoneware tiles or especially ceramic tiles.

Examples of hydraulically setting binders are cement, especially portland cement, aluminate cement, trass cement, slag cement, magnesia cement or phosphate cement, gypsum or waterglass. Preference is given to cement. Examples of fillers are quartz sand, calcium carbonate or talc. In addition, the building material compositions may comprise thickeners, for example polysaccharides, such as cellulose ethers or modified cellulose ethers, starch ethers, guar gum, xanthan gum, polycarboxylic acids, such as polyacrylic acid and the partial esters thereof, casein or associative thickeners. Examples of further additives are setting accelerators, such as alkali metal or alkaline earth metal salts of inorganic or organic acids. In addition, the following should be mentioned: hydrophobizing agents, film-forming auxiliaries, dispersants, foam stabilizers, defoamers, plasticizers and superplasticizers.

Typical formulations contain 5% to 80% by weight, especially 20% to 50% by weight, of hydraulically setting binders, 5% to 85% by weight, especially 40% to 70% by weight of fillers, 0.1% to 60% by weight, especially 0.5% to 15% by weight of the polymer mixtures of the invention, optionally 0.1% to 5% by weight, especially 0.1% to 3% by weight, of thickeners and optionally additives, where the figures in % by weight are based on the dry weight of formulation and add up to a total of 100% by weight. Also added to the formulation prior to application is the customary amount of water.

For production of the building material compositions, the polymer mixtures in the form of aqueous dispersions or water-redispersible powders are mixed and homogenized in customary mixers with the further formulation constituents, such as cement, filler and further additions. The dispersion powder can also be converted to an aqueous redispersion and be added in this form. Preference is given to producing a dry mix and adding the water required for processing directly prior to the processing. In the production of construction adhesives in paste form, the water content is preferably initially charged, the dispersion or powder is added and, finally, the solids are stirred in.

Advantageously, with the polymer mixtures of the invention, it is possible to extend the open time of building material compositions and at the same time to increase the creep resistance thereof. It has thus been possible to simultaneously improve intrinsically antagonistic properties of building material compositions with one and the same additive. Furthermore, cured products of building material compositions of the invention exhibit improved deformation stability. In addition, through use of the polymer mixtures of the invention, it is possible to improve further processing properties of mortar compositions, for example the viscosity stability thereof. It was particularly surprisingly here that the use of the inventive polymers A) and B) in the form of the inventive mixtures leads to a significant improvement in the aforementioned properties compared to the corresponding sole use of the polymers A) or B). This means that the inventive combination of polymers A) and B) is associated with a synergistic effect.

The examples which follow serve to illustrate the invention in detail and should in no way be regarded as a restriction.

Production of Polymer Mixtures

Polymer mixtures in the form of water-redispersible powders were produced by mixing the dispersion powders listed hereinafter in ratios corresponding to the figures in tables 1 to 3 in a conventional laboratory mixer.

Dispersion powder A (DPP-A):
Dispersion powder based on a polymer of vinyl acetate and ethylene with a Tg of 16° C., stabilized with polyvinyl alcohol, with calcium carbonate as antiblocking agent.

Dispersion powder B (DPP-B):
Dispersion powder based on a polymer of vinyl acetate, methyl methacrylate and ethylene with a Tg of 13° C., stabilized with polyvinyl alcohol, with calcium carbonate as antiblocking agent.

Dispersion powder C (DPP-C):
Dispersion powder based on a polymer of vinyl acetate, vinyl chloride and ethylene with a Tg of 13° C., stabilized with polyvinyl alcohol, with calcium carbonate as antiblocking agent.

Testing of the Polymer Mixtures in Mortars
Processing Properties of Tile Adhesive Mortars:
Mortars of the following formulation were produced and tested in accordance with EN 12004 as described hereinafter:

| | |
|---|---|
| CEM 42.5 Portland cement | 420 parts, |
| F34 quartz sand | 440 parts, |
| Durcal 65 | 81 parts, |
| MH10007P4 tylose | 4 parts, |
| calcium formate | 10 parts, |
| dispersion powder | 45 parts. |

To make up the mortar, 24 mL of water were used per 100 g of the constituents of the formulation.

The dispersion powders used in the respective (comparative) examples and the test results are stated in table 1.

Assessment of Trowel Tack:

The particular mortar was picked up with a trowel and thrown back into the mixing pot. An examination was made of whether the mortar meets user demands with regard to its trowel tack. In addition, an observation was made as to whether and how the mortar slid off a trowel held vertically. The assessment was made qualitatively using the following test criteria:

Grade 1: typical trowel tack, optimal property;
Grade 2: typical trowel tack, still adequate;
Grade 3: trowel tack too low.

Assessment of Thixotropy (Creep Resistance):

A bladed spatula was used to draw a groove as wide as the spatula into the mortar down to the base of the mixing vessel. Thixotrophy was assessed by the degree to which the mortar tended to merge again or collapse at the flanks of the groove. In addition, the bladed spatula was used to pick up the adhesive mortar and an assessment was made as to whether it ran or flowed off the spatula surface held vertically. The assessment was made qualitatively using the following test criteria:

Grade 1: mortar has ideal thixotropy and high creep resistance, without being tacky;
Grade 2: mortar is thixotropic and creep-resistant, somewhat tacky;
Grade 3: mortar has satisfactory thixotropy and satisfactory creep resistance.

Assessment of skin formation and exudation characteristics:

The mortar was introduced into a plastic vessel and left to stand uncovered for 60 minutes. Firstly, there was a visual assessment as to whether the mortar had a tendency to bleed/exude (discharge of water at the mortar surface). In addition, a bladed spatula was used to check whether a skin had formed during the wait time on the adhesive mortar. The assessment was made qualitatively using the following test criteria:

Grade 1: no exudation at all and no skin formation at all;
Grade 2: very slight exudation or very slight skin formation;
Grade 3: slight exudation or slight skin formation.

Assessment of Gassing (Air Bubble Formation):

The mortar was introduced into a plastic cup and left to stand uncovered for 60 minutes. An assessment was made as to whether air bubbles, especially large air bubbles, formed in the mortar after the wait time. The assessment was made qualitatively using the following test criteria:

Grade 1: no gassing at all, adhesive unchanged;
Grade 2: slight gassing;
Grade 3: distinct buildup of air, gassing, original consistency attainable again after stirring.

Assessment of Thickening and Rise in Viscosity:

The adhesive was introduced into a plastic cup and left to stand uncovered for 60 minutes. Subsequently, the following test criteria were used to assess the extent of any thickening of the mortar:

Grade 1: no thickening at all, mortar unchanged;
Grade 2: barely perceptible slight thickening of the mortar;
Grade 3: slight thickening, mortar can still be worked efficiently;
Grade 4: distinct thickening, the mortar can be worked again after stirring.

The results show that the inventive mortars of examples (IE) 3 to 5 exhibit better processing properties than the mortars of the comparative examples (CE) 1 and 2. The inventive procedure especially improves trowel tack, gassing, skin formation and also the thickening of the mortar.

TABLE 1

Processing properties of the tile adhesive mortars:

|  | Dispersion powder A | Dispersion powder C | Trowel tack | Thixotropy | Skin formation, exudation | Gassing | Thickening, rise in viscosity |
|---|---|---|---|---|---|---|---|
| CE1 | 100 | 0 | 2 | 2 | 2-3 | 2 | 3 |
| CE2 | 0 | 100 | 2 | 1-2 | 2 | 2 | 2-3 |
| IE3 | 25 | 75 | 1 | 1 | 1-2 | 1 | 2 |
| IE4 | 50 | 50 | 1 | 1 | 1-2 | 1 | 1-2 |
| IE5 | 80 | 20 | 1 | 1 | 1-2 | 1 | 1-2 |

Determination of the Open Time of the Mortars:

The open time (unit: N/mm$^2$) was determined according to EN 12004 (test standards EN 1348 and EN 1346) after 5, 20 and 30 minutes using the following formulation:

| CEM 42.5 portland cement | 420 parts, |
|---|---|
| F34 quartz sand | 440 parts, |
| Durcal 65 | 81 parts, |
| MH10007P4 tylose | 4 parts, |
| calcium formate | 10 parts, |
| dispersion powder | 45 parts. |

To make up the mortar, 24 mL of water were used per 100 g of the constituents of the formulation.

The dispersion powders used in the respective (comparative) examples and the test results are stated in table 2.

TABLE 2

Testing of open time:

|  |  |  | Open time | | |
|---|---|---|---|---|---|
|  | DPP-B | DPP-C | 5' | 20' | 30' |
| CE6 | 100 | 0 | 2.05 | 1.25 | 0.45 |
| CE7 | 0 | 100 | 2.10 | 1.20 | 0.55 |
| IE8 | 30 | 70 | 2.10 | 1.60 | 1.05 |
| IE9 | 50 | 50 | 2.00 | 1.45 | 0.60 |
| IE10 | 70 | 30 | 2.25 | 1.30 | 0.80 |

The results in table 2 show that the mortars of examples 8 to 10 comprising the polymer mixtures of the invention have distinct advantages over comparative examples 6 and 7 in terms of open time, especially after 30 minutes.

Deformation Stability of Specimens:

The determination was effected in accordance with EN 12002 by subjecting the specimens to three-point flexural stress. The following mortar formulations were used here:

| | |
|---|---:|
| CEM I 42.5R portland cement | 350 parts, |
| F31 quartz sand | 291.2 parts, |
| F34 quartz sand | 300 parts, |
| MB 15009 P2 tylose | 3 parts, |
| Solvitose H 2060 | 0.8 parts, |
| calcium formate | 5 parts, |
| dispersion powder | 50 parts. |

To make up the mortar, 23 mL of water were used per 100 g of the constituents of the formulation.

The dispersion powders used in the respective (comparative) examples and the test results are stated in table 3.

These results too illustrate that inventive example 13 is considerably advantageous over comparative examples 11 and 12 with regard to the deformation stability of the specimens.

TABLE 3

Testing of the deformation stability:

| | DPP-A | DPP-C | Bending [mm] |
|---|---|---|---|
| CE11 | 100 | 0 | 2.36 |
| CE12 | 0 | 100 | 2.21 |
| IE13 | 50 | 50 | 2.62 |

The invention claimed is:

1. A polymer mixture in the form of an aqueous dispersion or water-redispersible powder, comprising:
   A) one or more protective colloid-stabilized polymers having units derived from 20% to 30% by weight of vinyl chloride, 50% to 75% by weight of vinyl acetate, 5% to 20% by weight of ethylene, and optionally one or more further additional ethylenically unsaturated monomers, where the figures in % by weight are based on the total weight of the monomers and add up to 100% by weight, and
   B) one or more protective colloid-stabilized, vinyl halide-free polymers of one or more ethylenically unsaturated monomers.

2. The polymer mixture of claim 1, wherein one or more protective colloids comprise partly hydrolyzed or fully hydrolyzed polyvinyl alcohols; polyvinylpyrrolidones; polyvinyl acetals; polysaccharides in water-soluble form; proteins; lignosulfonates; poly(meth)acrylic acid; copolymers of (meth)acrylates with carboxy-functional comonomers units; poly(meth)acrylamide; polyvinylsulfonic acids and the water-soluble copolymers thereof; melamine formaldehydesulfonates; naphthalene formaldehydesulfonates; styrene-maleic acid, or vinyl ether-maleic acid copolymers.

3. The polymer mixture of claim 1, wherein the polymer mixtures comprise 5% to 95% by weight of one or more polymers A), based on the dry weight of polymers A) and B).

4. The polymer mixture of claim 2, wherein the polymer mixtures comprise 5% to 95% by weight of one or more polymers A), based on the dry weight of polymers A) and B).

5. The polymer mixture of claim 1, wherein the polymer mixture comprises 5% to 95% by weight of one or more polymers B), based on the dry weight of polymers A) and B).

6. The polymer mixture of claim 2, wherein the polymer mixture comprises 5% to 95% by weight of one or more polymers B), based on the dry weight of polymers A) and B).

7. The polymer mixture of claim 1, wherein the polymer mixture comprises 5% to 95% by weight of polymers A) and polymers B), based on the dry weight of the polymers mixture.

8. The polymer mixture of claim 1, wherein the further ethylenically unsaturated monomers of polymers A) are selected from the group consisting of vinyl esters, (meth)acrylic esters, vinylaromatics, olefins, 1,3-dienes, and mixtures thereof.

9. The polymer mixture of claim 1, wherein the polymers A) comprise units derived from one or more vinyl halides, one or more vinyl esters and optionally one or more additional ethylenically unsaturated monomers.

10. The polymer mixture of claim 1, wherein the polymers B) comprise units derived from one or more ethylenically unsaturated monomers selected from the group consisting of vinyl esters, (meth)acrylic esters, vinylaromatics, olefins, 1,3-dienes, and mixtures thereof.

11. A process for producing a polymer mixture of claim 1, comprising mixing one or more polymers A) with one or more polymers B).

12. A building material composition comprising one or more hydraulically setting binders, one or more fillers, and optionally one or more additives, characterized in that the building material compositions additionally comprise one or more polymer mixtures in the form of an aqueous dispersion or water-redispersible powder of claim 1.

13. In a building material composition, optionally in conjunction with hydraulically setting binders, for the production of construction adhesives, renders, spackling compounds, floor leveling compounds, sealing compounds, joint mortars or paints, wherein property improving polymer additives are incorporated as additives, the improvement comprising employing as at least one property improving additive, a polymer mixture of claim 1.

14. The polymer mixture of claim 1, wherein polymer B is a copolymer of ethylene and vinyl acetate.

15. The polymer mixture of claim 1, wherein polymer B is a terpolymer of vinyl acetate, methylmethacrylate, and ethylene.

* * * * *